United States Patent
Liu et al.

(10) Patent No.: US 9,576,379 B2
(45) Date of Patent: Feb. 21, 2017

(54) PRCA-BASED METHOD AND SYSTEM FOR DYNAMICALLY RE-ESTABLISHING PET IMAGE

(71) Applicant: Zhejiang University, Hangzhou, Zhejiang Province (CN)

(72) Inventors: Huafeng Liu, Hangzhou (CN); Xingjian Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 14/786,534

(22) PCT Filed: May 14, 2013

(86) PCT No.: PCT/CN2013/075593
§ 371 (c)(1),
(2) Date: Oct. 22, 2015

(87) PCT Pub. No.: WO2014/172927
PCT Pub. Date: Oct. 30, 2014

(65) Prior Publication Data
US 2016/0078646 A1 Mar. 17, 2016

(30) Foreign Application Priority Data
Apr. 23, 2013 (CN) .......................... 2013 1 0144543

(51) Int. Cl.
*G06K 9/00* (2006.01)
*G06T 11/00* (2006.01)
*G06T 7/00* (2006.01)

(52) U.S. Cl.
CPC ........... *G06T 11/006* (2013.01); *G06T 7/0012* (2013.01); *G06T 2207/10104* (2013.01); *G06T 2207/30004* (2013.01); *G06T 2211/424* (2013.01)

(58) Field of Classification Search
None
See application file for complete search history.

(56) References Cited

U.S. PATENT DOCUMENTS

2004/0222381 A1* 11/2004 Trotter .................. G01T 1/2985
250/395
2005/0023473 A1* 2/2005 Burr ...................... G01T 1/1611
250/368

(Continued)

*Primary Examiner* — Shervin Nakhjavan
(74) *Attorney, Agent, or Firm* — Jiwen Chen (57) ABSTRACT

Provided is a PRCA-based method for dynamically reestablishing a PET image. The method comprises: (1) performing collection and correction to obtain a coincidence counting matrix; (2) performing correction restriction on a PET measurement equation; (3) performing iterative estimation on PET dynamic concentration data; and (4) reestablishing each frame of PET image. In the present invention, different frames of collected data are regarded as a whole for reestablishment, and the relevancy of the PET data in time is fully used, so that the obtained result can embody the characteristic that the dynamic PET can show the time change of a target region; and secondly, in the present invention, a background and target region method is used, the interference to the target region caused by the background is reduced, in addition, the time and space correction are added in the reestablishment, the accuracy of the reestablishment result is higher, and the contrast between the target region and the background is improved. So that the reestablishment effect is more excellent than that of the traditional FBP and ML-EM algorithm, thereby providing higher medical value.

12 Claims, 4 Drawing Sheets

(56) References Cited

U.S. PATENT DOCUMENTS

| | | | |
|---|---|---|---|
| 2005/0129170 A1* | 6/2005 | Watson | G01T 7/005 378/5 |
| 2008/0069414 A1* | 3/2008 | Manjeshwar | G06K 9/00 382/128 |
| 2014/0126794 A1* | 5/2014 | Ahn | G06T 11/008 382/131 |
| 2014/0242602 A1* | 8/2014 | Chiosis | G01N 33/57407 435/7.1 |
| 2015/0230762 A1* | 8/2015 | Alpert | A61B 6/037 600/425 |

* cited by examiner

PRCA-BASED METHOD AND SYSTEM FOR DYNAMICALLY RE-ESTABLISHING PET IMAGE

This is a U.S. national stage application of PCT Application No. PCT/CN2013/075593 under 35 U.S.C. 371, filed May 14, 2013 in Chinese, claiming the priority benefit of Chinese Application No. 201310144543.6, filed Apr. 23, 2013, which is hereby incorporated by reference.

TECHNICAL FIELD

The present invention belongs to the positron emission tomography (PET) imaging technical field, and more specifically, relates to a robust principal component analysis (PRCA) based method and system for dynamically re-establishing PET images.

BACKGROUND OF THE INVENTION

The Positron emission tomography (PET) is a medical imaging technology based on nuclear physics and molecular biology. It can observe cells metabolism at molecular level, and provide effective basis for early detection of diseases especially tumors or cancers. In principle, the process of the PET imaging is to imaging the concentration distribution of the medicine in a patient's body. The radioactive isotope tracing drugs (tracers) injected into a patient's body enter into circulation system through blood and these drugs form a certain concentration distribution in different organs of the body. Since the half-time of the radioactive tracer is short and extremely unstable, the decay of the tracer would happen quickly and create a positron. This positron would be annihilated with the electron around, and it would create a pair of gamma photons with equally energy of 511 keV in the opposite direction. These photon pairs are detected by the detecting rings, then the photon pairs with radioactive drugs distribution data are processed by the coincidence process module to create the sinogram data. After that, the radioactive substance spatial concentration distribution in the body is reestablished by using corresponding mathematical methods to inverse and solve the sonogram data.

In recent years, PET imaging is increasingly and widely used in applied medical field. While at the same time, the clinical requirement for PET imaging has become higher. Higher spatial resolutions and real time scanning of patients are increasingly required in PET imaging in more and more medical fields. The increasing dimension of images and significant amount of data has become a challenge for the present reconstruction algorithms. In addition, these requirements also results in a higher requirement for the computer calculation capacity and memory.

At present, dynamic image reconstruction approaches largely fall into two groups: math analysis method and traditional iterative method. The first one mainly includes filtered back projection (FBP). It could obtain the reconstruction images in a short time but the accuracy of the reestablished images is not high enough and has serious artifacts. The other group includes the most frequently used Maximum Likelihood and Expectation. Maximization (ML-EM) method. This method improves the spatial resolution of the reconstructed images, but there are still serious artifacts in the reconstructed images. In addition, both of these methods consider the each frame as being independent from other frames. Therefore, the reconstructed images could not prove the time-relationship in dynamic PET images; besides neither of them are able to extract the target region form the background noise. Thus neither of them is robust to deal with interference of the noise data.

SUMMARY OF THE INVENTION

In light of the above technical drawbacks of the prior art, the present invention provides a PRCA-based method and system for dynamically re-establishing PET image, and it could solve the low-accuracy problem in the dynamic PET imaging by computers. A PRCA-based method for dynamic PET imaging, comprises the following steps:

(a) Using a detector to detect the biological organs where the radioactive substance is injected, dynamically obtaining n groups of coincidence count vectors of the PET, correcting the coincidence count vectors, establishing a coincidence count matrix; n is a natural number greater than 1.

(b) Setting up a measurement equation based on a principle of the PET imaging.

(c) Obtaining a following iterative equation by conducting correction constrains of time and space of the measurement equation; estimating the concentration of dynamic PET data through the following iterative equation and based on the coincidence count matrix:

$$(X_{k+1}, Z_{k+1}) = \arg\min_{X,Z}\{\|G(X+Z)-Y-A_k\|^2 + \|X-B_k-C_k\|^2 + r\|HZ-D_k+E_k\|^2\}$$

wherein $X_{k+1}$ is the PET concentration distribution matrix after (k+1)-th iteration-, $Z_{k+1}$ is the PET background concentration distribution matrix after k+1 iterations, G is a system matrix and H is a correction matrix. Y is a coincidence count matrix, r is a correction coefficient, $A_k$ is the first correction coefficient matrix after k iterations, $B_k$ is the second correction coefficient after k iterations, $C_k$ is the third correction coefficient matrix after k iterations, $D_k$ is the fourth correction coefficient matrix after k iterations, $E_k$ is k iterations of the fifth correction coefficient matrix. X and Z are respectively randomized matrix corresponding to the $X_{k+1}$ and $Z_{k+1}$. k is a natural number.

(d) decomposing PET concentration distribution data to obtain n successive frames of the PET images:

The measurement equation of the PET imaging could be expressed as:

$$y = Gx$$

wherein G represents the system matrix, y represents the corrected coincidence count vector, x is the PET concentration distribution vector. In the step (3), through iterative calculation based on the coincidence counting matrix equation, the iteration PET concentration distribution matrix after convergence is the concentration of dynamic PET data.

The iteration convergence condition is expressed as:

$$\frac{\|Y - G(X_k + Z_k)\|_F}{\|Y\|_F} \leq \rho$$

wherein $X_k$ is the PET concentration distribution matrix after the k-th iteration, $Z_k$ is the PET background concentration distribution matrix after k-th reiteration, $\rho$ is the value of the stopping criterion, $\|*\|_F$ is the Frobenius norm.

The first correction coefficient matrix $A_k$ after k-th iteration could be calculated as:

$$A_k = A_{k-1} + G(X_k + Z_k) - Y$$

wherein $A_{k-1}$, is (k−1)-th iterations of the first correction coefficient matrix, $X_k$ is the PET concentration distribution matrix after k-th iteration, $Z_k$ is the PET background concentration distribution matrix after k-th reiteration.

The second correction coefficient matrix $B_k$ after k-th iteration could be calculated as:

$$B_k = U_k \cdot \text{diag}(\max(i_k - 1, 0)) \cdot V_k$$

$$W_k = U_k \cdot \text{diag}(i_k) \cdot V_k$$

wherein $W_k$ is the matrix to be decomposed after k-th iteration, and it could be expressed as $W_k = X_k + C_{k-1}$. $X_k$ is the PET concentration distribution matrix after k-th iteration, $C_{k-1}$ is the third correction coefficient matrix after the (k−1)-th iteration. $U_k$, $\text{diag}(i_k)$ and $V_k$ are respectively the time parameter matrix, the diagonal matrix of the singular values and intermediary parameter matrix that are obtained decomposition of the singular values of the matrix to be decomposed $W_k$, $i_k$ is diagonal element of the diagonal matrix of the singular values $\text{diag}(i_k)$.

The third correction coefficient matrix $C_k$ after k-th iteration could be calculated as:

$$C_k = C_{k-1} + X_k - B_k$$

wherein $X_k$ is the PET concentration distribution matrix after k-th iteration, $C_{k-1}$ is (k−1)-th iterations of the third correction coefficient matrix.

The fourth correction coefficient matrix $D_k$ after k-th iteration could be calculated as:

$$D_k = \text{sgn}(HZ_k + E_{k-1}) \cdot \max(|HZ_k + E_{k-1}| - r, 0)$$

wherein, $Z_k$ is the PET background concentration distribution matrix after k-th reiteration $E_{k-1}$ the fifth correction coefficient matrix after the (k−1)-th iteration.

The fifth correction coefficient matrix $E_k$ after k-th iteration could be calculated as:

$$E_k = E_{k-1} + HZ_k - D_k$$

wherein $E_{k-1}$ is the fifth correction coefficient matrix after (k−1)-th iteration, $Z_k$ is the PET background concentration distribution matrix after k-th reiteration.

The correction parameter r can be calculated as:

$$r = 1/\sqrt{\max(n, m)}$$

wherein m is the dimension of the coincidence data vector.

In the present invention, the dimension of the coincidence data vector is m, the dimension of the PET concentration distribution matrix is p×n, thus, the dimension of the system matrix G is m×p, which represents the probability of the annihilation photons detected by the PET detectors. The probability depends on the structure of the PET detector system, the detection efficiency of the detector, attenuation and dead time, etc. The coincidence count matrix consists of n coincidence count vectors, and the dimension of it is m×n. The correction matrix H is an m×p multistage wavelet decomposition operator, which satisfies $H^T H = I$ wherein I is the unit matrix.

The present invention of a PRCA-based method and system for dynamically re-establishing PET image comprises a detector and a computer operably connected to the detector.

The detectors are used to detect the biological organisms where the radioactive substances/tracers are injected and are used to dynamically collecting the n groups of coincidence count vectors of the PET, where n>1 and is a natural number.

The computer is loaded with the following function modules:

The data-acquisition module is used to receive and correct the coincidence count vectors, and establish the PET coincidence count matrix.

The concentration estimation module is used to estimate the dynamic PET concentration data based on the coincidence count matrix through the preset iteration equation group.

The PET imaging module is used to decompose the PET dynamic concentration data and obtain n frames of successive PET images.

The activity estimation module estimates the PET concentration dynamic data based on the following functions:

$$(X_{k+1}, Z_{k+1}) =$$
$$\arg\min_{X,Z}\{\|G(X+Z) - Y - A_k\|^2 + \|X - B_k - C_k\|^2 + r\|HZ - D_k + E_k\|^2\}$$

$$A_k = A_{k-1} + G(X_k + Z_k) - Y$$

$$B_k = U_k \cdot \text{diag}(\max(i_k - 1, 0)) \cdot V_k$$

$$W_k = U_k \cdot \text{diag}(i_k) \cdot V_k$$

$$C_k = C_{k-1} + X_k - B_k$$

$$D_k = \text{sgn}(HZ_k + E_{k-1}) \cdot \max(|HZ_k + E_{k-1}| - r, 0)$$

$$E_k = E_{k-1} + HZ_k - D_k$$

$$r = 1/\sqrt{\max(n, m)}$$

wherein $X_{k+1}$ is the PET concentration distribution matrix after (k+1)-th iteration, $Z_{k+1}$ is the PET background concentration distribution matrix after (k+1)-th iteration, G is the system matrix and H is the correction matrix. Y is the coincidence data matrix, r is the correction coefficient, $A_k$ is the first correction coefficient matrix after k-th iteration, $B_k$ is the second correction coefficient matrix after k-th iteration, $C_k$ is the third correction coefficient matrix after k-th iteration, $D_k$ is the fourth correction coefficient matrix after k-th iteration, $E_k$ is the fifth correction coefficient matrix after k-th iteration. X and Z are respectively the randomized matrices corresponding to the $X_{k+1}$ and $Z_{k+1}$. $A_{k-1}$ is the first correction coefficient matrix after the (k−1)-th iteration, $X_k$ is the PET concentration distribution matrix after k-th iteration, $Z_k$ is the PET background concentration distribution matrix after k-th reiteration. $W_k$ is the matrix to be decomposed after k-th iteration, and it could be expressed as $W_k = X_k + C_{k-1}$. $C_{k-1}$ is the third correction coefficient matrix after (k−1)-th iteration. $U_k$, $\text{diag}(i_k)$ and $V_k$ are respectively the time parameter matrix, the diagonal matrix of the singular values and intermediary parameter matrix that are obtained decomposition of the singular values of the matrix to be decomposed $W_k$, $i_k$ is diagonal element of the diagonal matrix of the singular values $\text{diag}(i_k)$. $E_{k-1}$ is the fifth correction coefficient matrix after (k−1)-th iteration, m is the dimension of the coincidence count vector, k is a natural number. The PET concentration distribution matrix after iteration is the PET concentration dynamic data.

The benefit of the present invention is that the data of the different frames are considered as a whole to reconstruct the images. It would make full use of the time-relation of the dynamic PET data and results in the time variation of the target region in the dynamic PET images are more obvious. Secondly, the target and background decomposition method is used in the present invention; it reduces the effect of the noise in target region and adds the spatial and time correction in the reconstructions. In addition, it results in the enhancement of the accuracy and robustness of the reconstruction and higher contrast of the target region. All of these results in the proposed method are better than the traditional FBP and ML-EM method. It is more suitable for clinical application.

BRIEF DESCRIPTION OF THE DRAWINGS

FIG. 3 (a) illustrates the image simulated by Monte Carlo simulation in noise level 1.

FIG. 3 (b) illustrates the image simulated by Monte Carlo simulation in noise level 2.

FIG. 4 (a) illustrates the original concentration results of simulated image in level 1.

FIG. 4 (b) illustrates the reconstruction concentration results of simulated image according to ML-EM method in level 1.

FIG. 4 (c) illustrates the reconstruction concentration results of simulated image according to PRCA method of the present invention in level 1.

FIG. 5 (a) illustrates the original concentration results of simulated image in level 2.

FIG. 5 (b) illustrates the reconstruction concentration results of simulated image according to ML-EM method in level 2.

FIG. 5 (c) illustrates the reconstruction concentration results of simulated image according to PRCA method of the present invention in level 2.

FIG. 7 (a) illustrates the original concentration results of the phantom.

FIG. 7 (b) illustrates the reconstructed concentration results of phantom by ML-EM method.

FIG. 7 (c) illustrates reconstructed concentration results of phantom by PRCA method of the present invention.

DETAILED DESCRIPTION OF THE INVENTION

Figure 1:
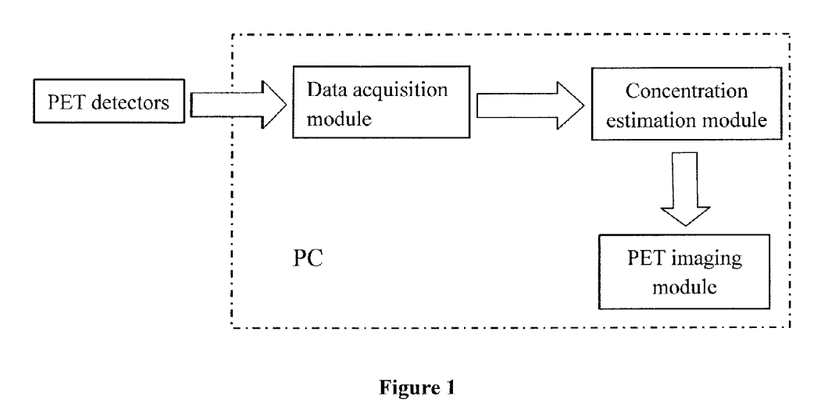
FIG. 1 illustrates the structure of the estimation system of the present invention.

For a more specific description of the present invention, a detail explanation of the technology solution of the present invention with reference to the drawings and detailed implementation embodiments are as follows:

As shown in FIG. 1, a PRCA-based method and system for dynamically re-establishing PET image comprises a detector and a computer operably connected to the detector. The process schematic of the PRCA is shown in the FIG. 2, wherein:

The detectors are used to detect the biological organism into which the radioactive substance/tracer is injected, to dynamically collect n groups of coincidence count vectors of PET. In this embodiment, the used PET system is the Hamamatsu SHR74000 PET scanner.

The computer is loaded with data acquisition module, concentration estimation module and PET imaging module, wherein:

The data-acquisition module is used to receive and correct the coincidence count vectors; the PET scanner detects the radioactive signal from the human body and forms the original coincidence events after coincidence and collection system processing. The events recorded by the PET scanner are actual coincidence event, random coincidence event and scatter coincidence event. The time delay window and energy window of the detector are used to correct the random event and scatter event, then the attenuation correction is performed. After that, the sinogram is obtained and recorded as y (the corrected coincidence count vector).

For the corrected n coincidence count vectors y, the data-acquisition module establishes a PET coincidence count matrix Y constituted by the coincidence count vectors y. The dimension of this matrix is m×n. Every column of the coincidence count matrix Y corresponds to a group of coincidence count vectors y.

The concentration estimation module is used to estimate the dynamic PET concentration data based on the preset iterative function and coincidence count matrix Y.

Figure 2:
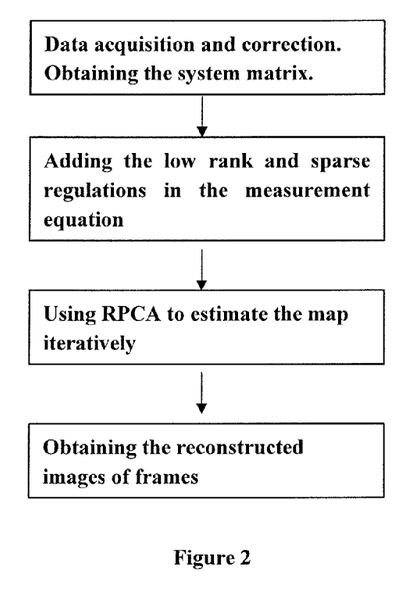
FIG. 2 illustrates the steps flowing chart of the estimation method of the present invention.

Based on the principle of the PET imaging, the measurement equation of the PET imaging could be expressed as following:

$$y = Gx$$

wherein y represents the corrected coincidence count vector and is a vector with m dimension, x is the concentration distribution vector of the PET images and the dimension of it is p, G is the m×p system matrix. The system matrix presents the probability of the annihilation photons detected by the PET detectors. It depends on the structure of the PET detector system, the detection effect of the detector, attenuation and dead time, etc.

Adding timing and spatial constraint to the measurement equation and the following iterative function group is obtained:

$$(X_{k+1}, Z_{k+1}) = \arg\min_{X,Z} \{\|G(X+Z) - Y - A_k\|^2 + \|X - B_k - C_k\|^2 + r\|HZ - D_k + E_k\|^2\}$$

$$A_k = A_{k-1} + G(X_k + Z_k) - Y$$

$$B_k = U_k \cdot \text{diag}(\max(i_k - 1, 0)) \cdot V_k$$

$$W_k = U_k \cdot \text{diag}(i_k) \cdot V_k$$

$$C_k = C_{k-1} + X_k - B_k$$

$$D_k = \text{sgn}(HZ_k + E_{k-1}) \cdot \max(|HZ_k + E_{k-1}| - r, 0)$$

$$E_k = E_{k-1} + HZ_k - D_k$$

$$r = 1 / \sqrt{\max(n, m)}$$

wherein $X_{k+1}$ is the PET concentration distribution matrix after (k+1)-th iteration, $Z_{k+1}$ is the PET background concentration distribution matrix after (k+1)-th iteration, G is the system matrix and H is the correction matrix. Y is the coincidence count matrix, r is the correction coefficient, $A_k$ is the first correction coefficient matrix after k-th iteration, $B_k$ is the second correction coefficient matrix after k-th iteration, $C_k$ is the third correction coefficient matrix after k-th iteration, $D_k$ is the fourth correction coefficient matrix after k-th iteration, $E_k$ is the fifth correction coefficient matrix after k-th iteration. X and Z are respectively the randomized matrix corresponding to $X_{k+1}$ and $Z_{k+1}$. $A_{k-1}$ is the first correction coefficient matrix after (k−1)-th iteration, $X_k$ is the PET concentration distribution matrix after k-th iteration, $Z_k$ is the PET background concentration distribution matrix after k-th reiteration. $W_k$ is the matrix to be decomposed after k-th iteration, and it could be expressed as $W_k = X_k + C_{k-1}$. $C_{k-1}$ is the third correction coefficient matrix after the (k−1)-th iteration. $U_k$ diag($i_k$) and $V_k$ are respectively the time parameter matrix, the diagonal matrix of the singular values and intermediary parameter matrix that are obtained decomposition of the singular values of the matrix to be decomposed $W_k$. $i_k$ is diagonal element of the diagonal matrix of the singular values diag($i_k$). $E_{k−1}$ is the fifth correction coefficient matrix after (k−1)-th iteration.

In the present embodiment, the dimension of the PET concentration distribution matrix X is p×n. Every column of this matrix corresponds to a group of PET concentration distribution vector x; $X_0$, $Z_0$, $A_0$, $B_0$, $C_0$, $D_0$ and $E_0$ are initial to zero-matrix. The correction matrix H is an m×p multi-stage wavelet decomposition operator, which satisfies $H^T H = I$ where I is the unit matrix.

The function could be solved through iteration based on the above coincidence count matrix Y. When the iteration is stopped, the PET concentration distribution matrix is the PET concentration dynamic data. The relative stopping criterion is expressed as:

$$\frac{\|Y - G(X_k + Z_k)\|_F}{\|Y\|_F} \leq \rho$$

wherein ρ is the value of the stopping criterion, $\|*\|_F$ is the Frobenius norm. In this specific embodiment, $\rho = 10^{-3}$ and the maximum number of the iteration is 50.

The PET imaging module is used to decompose the PET concentration distribution dynamic data and obtain n frames of successive PET images. Since the concentration distribution matrix after iteration is p×n matrix, each column of the concentration distribution matrix corresponds to a group of PET concentration distribution vectors (a frame of PET image data, reorganizing vectors of each column will reconstruct the PET image.

The following is the two groups of verification experiments we conducted according to the embodiment of the present invention. The first experiment used Monte Carlo simulation. The second experiment used six cylinder phantoms for simulation.

Figure 3:
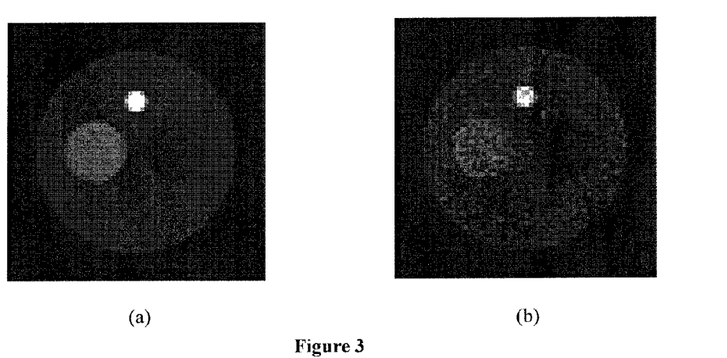
Figure 4:
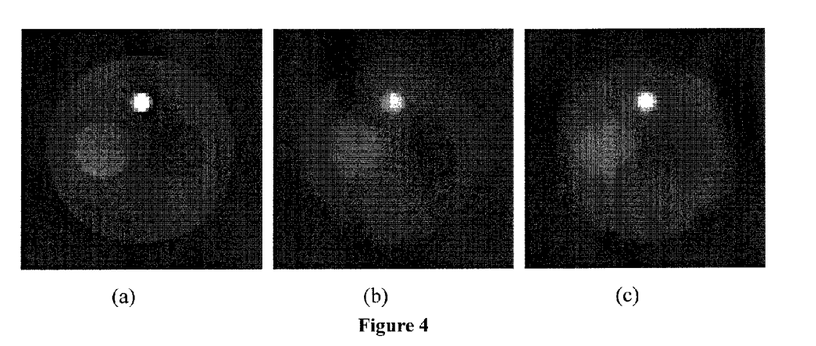
Figure 5:
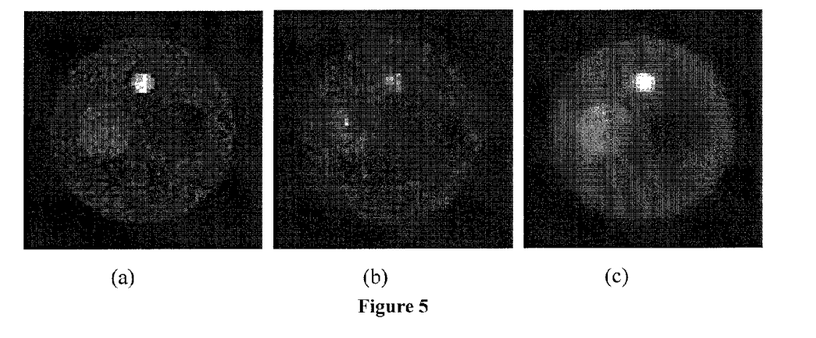

In the first experiment, we used 48 sample angles over 180 degrees. All sample results are divided into 20 frames. We obtained two groups of simulation images with different calculation rate and noise levels, as shown in FIG. 3; wherein Level1 corresponds to 0.53% random noise and 0.03% scatter noise with the count rate of each frame being $7 \times 10^6$; Level2 corresponds to 1.28% random noise and 22.9% scatter noise with the count rate of each frame being $2.5 \times 10^5$. The comparisons between ML-EM and PRCA method are given in FIGS. 4 and 5. The shown image results are those of the $8^{th}$ frame of the data set. In order to better quantify the results, we have calculated the deviation and variance of reconstruction results of the ML-EM method and the proposed method of the present invention, the results are given in Table 1.

TABLE 1

| Model | Method | Frames | Deviation ± Variance |
|---|---|---|---|
| Level 1 | ML-EM | 1 | 1.7837 ± 0.5648 |
|  |  | 8 | 1.7828 ± 0.5626 |
|  |  | 20 | 1.7792 ± 0.5585 |
|  | PRCA of the embodiment | 1 | 1.7221 ± 0.5044 |
|  |  | 8 | 1.7204 ± 0.5023 |
|  |  | 20 | 1.7176 ± 0.4995 |
| Level 2 | ML-EM | 1 | 6.6562 ± 4.2136 |

TABLE 1-continued

| Model | Method | Frames | Deviation ± Variance |
|---|---|---|---|
|  |  | 8 | 6.6370 ± 4.1770 |
|  |  | 20 | 6.6225 ± 4.2728 |
|  | PRCA of the embodiment | 1 | 6.0442 ± 3.7571 |
|  |  | 8 | 6.0575 ± 3.7182 |
|  |  | 20 | 6.0490 ± 3.8998 |

Figure 6:
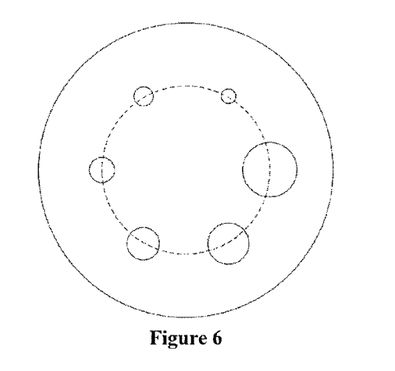
FIG. 6 illustrates the image of the phantom used in the present invention.
Figure 7:
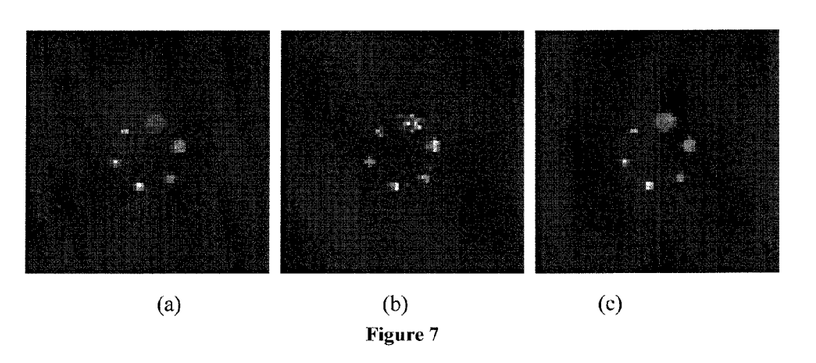
Figure 8:
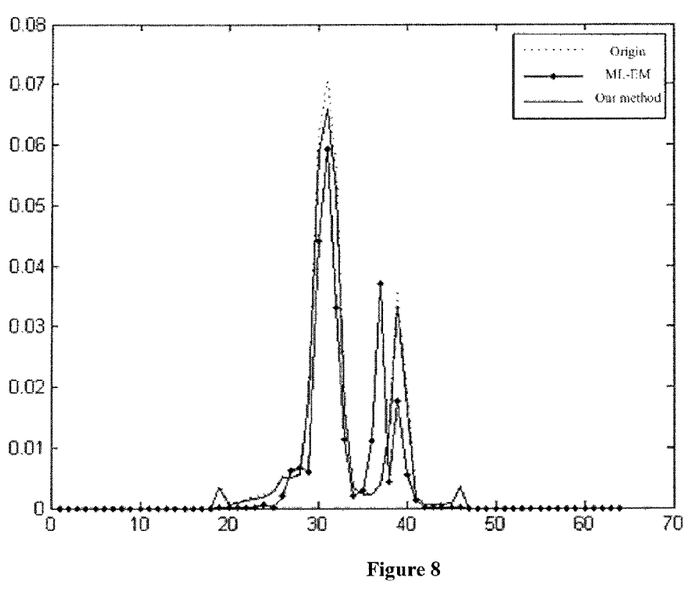
FIG. 8 illustrate the comparison the images values at line 40 in the reconstructed results of the phantom.

In the second experiment, we reconstructed a real phantom data. We used cylinder phantom. The dimension of the phantom is 200 mm (diameter)×290 mm (depth) in FIG. 6, which contains six circular regions of different diameters. These sphere objects have diameters of 37 mm, 28 mm, 22 mm, 17 mm, 13 mm, 10 mm. We injected F-18 tracing substance with a radioactive concentration of 107.92 Bq/ml. The sampling time is 120 minutes. The comparison results are shown in FIG. 7. For the same reason, in order to better quantify the results, we selected for comparison the imaging pixel values of line 40 in the images, the results are shown in FIG. 8.

Based on the results of these experiments, we could conclude that both of the reconstructed images and variance and deviation of the PRCA of the present invention are better than those of the ML-EM. Therefore, we can see that the RPCA method effectively improved the accuracy of the dynamic reconstruction of PET images and significantly improved the contrast of the target image region and background.

The invention claimed is:

1. A method for dynamically reconstructing positron emission tomography (PET) images based on a robust principal component analysis (PRCA), comprising the following steps:

(1) using a detector to detect a biological organism injected with a radioactive substance, dynamically collecting n groups of coincidence count vectors of the PET, and correcting the coincidence count vectors, then constructing a coincidence count matrix of the PET; n is a natural number greater than 1;

(2) establishing a measurement equation of the PET based on the principle of the PET imaging;

(3) adding correction conditions to time and space factors of the measurement equation; estimating PET concentration data based on the coincidence count matrix and through following iteration equation:

$$(X_{k+1}, Z_{k+1}) = \arg\min_{X,Z}\{\|G(X+Z) - Y - A_k\|^2 + \|X - B_k - C_k\|^2 + r\|HZ - D_k + E_k\|^2\}$$

wherein $X_{k+1}$ is a PET concentration distribution matrix after (k+1)-th iteration, $Z_{k−1}$ is a PET background concentration distribution matrix after (k+1)-th iteration, G is a system matrix, H is a correction matrix, Y is a coincidence count matrix, r is a correction coefficient, $A_k$ is a first correction coefficient matrix after k-th iteration, $B_k$ is a second correction coefficient matrix after k-th iteration, $C_k$ is a third correction coefficient matrix after k-th iteration, $D_k$ is a fourth correction coefficient matrix after k-th iteration, $E_k$ is a fifth correction coefficient matrix after k-th iteration, X and Z are respectively randomized matrix corresponding to $X_{k+1}$ and $Z_{k+1}$, k is a natural number;

(4) separating or decomposing the PET concentration data to obtain n frames of successive PET images.

2. The method of claim 1, characterized in that the measurement equation is as follows:

$$y = Gx$$

wherein G is a system matrix; y corrected coincidence count vector; x is PET concentration distribution vector.

3. The method of claim 1, characterized in that: in step (3), conducting iteration operation through the iteration equation based on the coincidence count matrix, PET concentration distribution matrix after stopping iteration calculation is the PET concentration dynamic data; iteration stopping criterion is as follows:

$$\frac{\|Y - G(X_k + Z_k)\|_F}{\|Y\|_F} \leq \rho$$

wherein $X_k$ is the PET concentration distribution matrix after k-th iteration, $Z_k$ is the PET background concentration distribution matrix after k-th reiteration, $\rho$ is value of the stopping criterion, $|*\|_F$ is a Frobenius norm.

4. The method of claim 1, characterized in that: the first correction coefficient matrix $A_k$ after k-th iteration is calculated as:

$$A_k = A_{k-1} + G(X_k + Z_k) - Y$$

wherein $A_{k-1}$ is the first correction coefficient matrix after (k−1)-th iteration, $X_k$ is the PET concentration distribution matrix after k-th iteration, $Z_k$ is the PET background concentration distribution matrix after k-th reiteration.

5. The method of claim 1, characterized in that: the third correction coefficient matrix $C_k$ after k-th iteration is calculated as follows:

$$C_k = C_{k-1} + X_k - B_k$$

wherein $X_k$ is the PET concentration distribution matrix after k-th iteration, $C_{k-1}$ is the third correction coefficient matrix after (k−1)-th iteration.

6. The method of claim 5, characterized in that: the second correction coefficient matrix $B_k$ after k-th iteration is calculated as follows:

$$B_k = U_k \cdot \mathrm{diag}(\max(i_k - 1, 0)) \cdot V_k$$

$$W_k = U_k \cdot \mathrm{diag}(i_k) \cdot V_k$$

wherein $W_k$ is a matrix to be decomposed after k-th iteration, and $W_k = X_k + C_{k-1}$, $C_{k-1}$ is the third correction coefficient matrix of (k−1)-th iteration, $U_k$, $\mathrm{diag}(i_k)$ and $V_k$ are respectively the time parameter matrix, the diagonal matrix of the singular values and intermediary parameter matrix that are obtained decomposition of the singular values of the matrix to be decomposed $W_k$, $i_k$ is diagonal element of the diagonal matrix of the singular values $\mathrm{diag}(i_k)$.

7. The method of claim 1, characterized in that: the second correction coefficient matrix $B_k$ after k-th iteration is calculated as follows:

$$B_k = U_k \cdot \mathrm{diag}(\max(i_k - 1, 0)) \cdot V_k$$

$$W_k = U_k \cdot \mathrm{diag}(i_k) \cdot V_k$$

wherein $W_k$ is a matrix to be decomposed after k-th iteration, and $W_k = X_k C_{k-1}$ is the third correction coefficient matrix of (k−1)-th iteration, $U_k$, $\mathrm{diag}(i_k)$ and $V_k$ are respectively the time parameter matrix, the diagonal matrix of the singular values and intermediary parameter matrix that are obtained decomposition of the singular values of the matrix to be decomposed $W_k$, $i_k$ is diagonal element of the diagonal matrix of the singular values $\mathrm{diag}(i_k)$.

8. The method of claim 1, characterized in that the fifth correction coefficient matrix $E_k$ after k-th iteration is calculated as follows:

$$E_k = E_{k-1} + HZ_k - D_k$$

wherein $Z_k$ is the PET background concentration distribution matrix after k-th reiteration, $E_{k-1}$ is the fifth correction coefficient matrix after (k−1)-th iteration.

9. The method of claim 8, characterized in that: the fourth correction coefficient matrix $D_k$ after k-th iteration is calculated as follows:

$$D_k = \mathrm{sgn}(HZ_k + E_{k-1}) \cdot \max(HZ_k + E_{k-1}|r, 0)$$

wherein $Z_k$ is the PET background concentration distribution matrix after k-th reiteration, $E_{k-1}$ is the fifth correction coefficient matrix after (k−1)-th iteration.

10. The method of claim 1, characterized in that: the fourth correction coefficient matrix $D_k$ after k-th iteration is calculated as follows:

$$D_k = \mathrm{sgn}(HZ_k + E_k) \cdot \max(|HZ_k + E_{k-1}| - r, 0)$$

wherein $Z_k$ is the PET background concentration distribution matrix after k-th reiteration, $E_{k-1}$ is the fifth correction coefficient matrix after (k−1)-th iteration.

11. A system for dynamically reconstructing positron emission tomography (PET) images based on a robust principal component analysis (PRCA), comprising a detector and a computer operably connected with the detector; the detector is used to detect a biological organism injected with a radioactive substance, dynamically collect n groups of coincidence count vectors of the PET, n is a natural number greater than 1; characterized in that:

the computer is loaded with following functional modules:

a data acquisition module used to obtain and correct the coincidence count vectors, then set up a coincidence count matrix of the PET;

a concentration estimation module used to estimate the dynamic PET concentration data based on the coincidence count matrix through the preset iterative function;

a PET imaging module used to decompose the dynamic PET concentration data to obtain n frames of successive PET images.

12. The system of claim 11, characterized in that: the concentration estimation module estimates the PET concentration dynamic data according to the following functions:

$$(X_{k+1}, Z_{k+1}) = \arg\min_{X,Z}\{\|G(X+Z) - Y - A_k\|^2 + \|X - B_k - C_k\|^2 + r\|HZ - D_k + E_k\|^2\}$$

$$A_k = A_{k-1} + G(X_k + Z_k) - Y$$

$$B_k = U_k \cdot \mathrm{diag}(\max(i_k - 1, 0)) \cdot V_k$$

$$W_k = U_k \cdot \mathrm{diag}(i_k) \cdot V_k$$

$$C_k = C_{k-1} + X_k - B_k$$

$$D_k = \mathrm{sgn}(HZ_k + E_{k-1}) \cdot \max(|HZ_k + E_{k-1}| - r, 0)$$

-continued $$E_k = E_{k-1} + HZ_k - D_k$$

$$r = 1/\sqrt{\max(n, m)}$$

wherein $X_{k+1}$ is a PET concentration distribution matrix after (k+1)-th iteration, $Z_{k+1}$ is a PET background concentration distribution matrix after (k+1)-th iteration, G is a system matrix, H is a correction matrix, Y is a coincidence count matrix, r is a correction coefficient, $A_k$ is a first correction coefficient matrix after k-th iteration, $B_k$ is a second correction coefficient matrix after k-th iteration, $C_k$ is a third correction coefficient matrix after k-th iteration, $D_k$ is a fourth correction coefficient matrix after k-th iteration, $E_k$ is a fifth correction coefficient matrix after k-th iteration, X and Z are respectively randomized matrix corresponding to $X_{k+1}$ and $Z_{k+1}$, $A_{k-1}$ is the first correction coefficient matrix after the (k−1)-th iteration, $X_k$ is the PET concentration distribution matrix after k-th iteration, $Z_k$ is the PET background concentration distribution matrix after k-th reiteration, $W_k$ is the matrix to be decomposed after k-th iteration, and $W_k = X_k + C_{k-1}$, $C_{k-1}$ is the third correction coefficient matrix after (k−1)-th iteration, $U_k$, diag($i_k$) and $V_k$ are respectively a time parameter matrix, a diagonal matrix of singular values and an intermediary parameter matrix that are obtained decomposition of the singular values of the matrix to be decomposed $W_k$, $i_k$ is diagonal element of the diagonal matrix of the singular values diag($i_k$), $E_{k-1}$ is the fifth correction coefficient matrix after (k−1)-th iteration, m is the dimension of the coincidence count vector, k is a natural number; the PET concentration distribution matrix after iteration is the PET concentration dynamic data.

* * * * *